July 10, 1951
A. J. KLOSE
2,559,823
RUDDER FOR TAILLESS AIRPLANES
Filed April 9, 1945
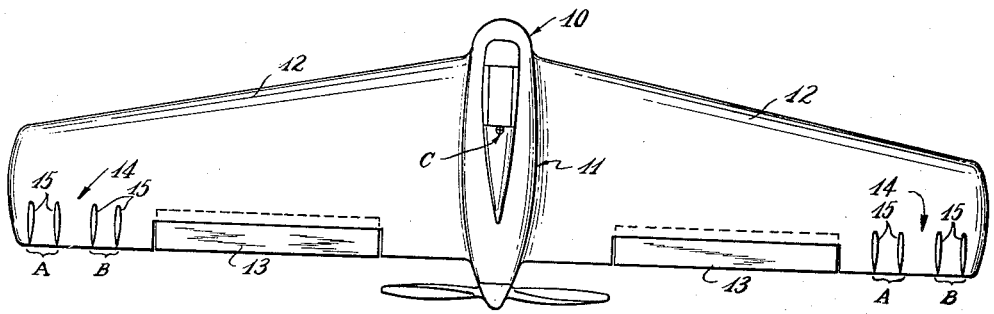
Fig. 1
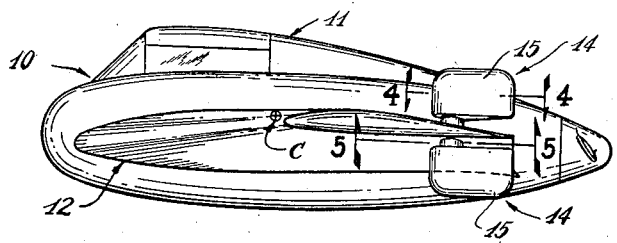
Fig. 2
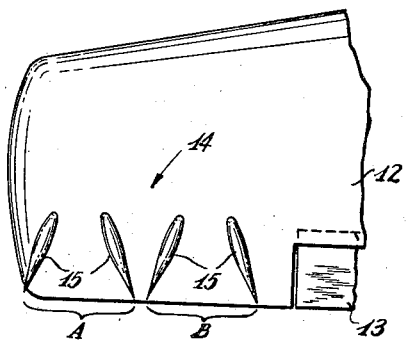
Fig. 3
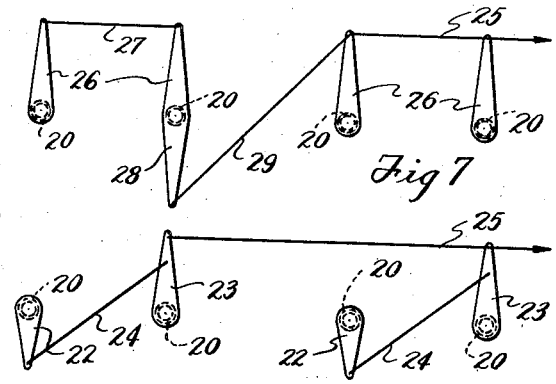
Fig. 7
Fig. 6
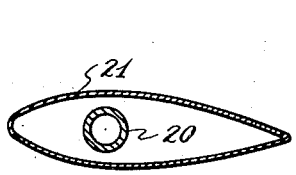
Fig. 5
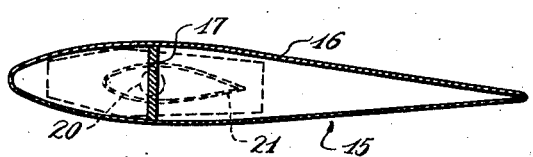
Fig. 4
INVENTOR.
BY ALFRED J. KLOSE
Attorney Patented July 10, 1951

2,559,823

UNITED STATES PATENT OFFICE 2,559,823

RUDDER FOR TAILLESS AIRPLANES

Alfred J. Klose, Rolling Hills, Calif., assignor to Northrop Aircraft, Inc., Hawthorne, Calif., a corporation of California Application April 9, 1945, Serial No. 587,360

2 Claims. (Cl. 244—87)

The present invention relates generally to aircraft, and more particularly to rudder means for providing yaw control and directional stability in tailless airplanes.

Yaw control in tailless airplanes is usually obtained by means of drag-inducing elements carried at the outer ends of the wings, and in the past such drag-inducing elements have usually been in the form of split flaps which are simultaneously deflected upwardly and downwardly, or spoilers which are simultaneously projected through the upper and lower surfaces of the wing, or downwardly projected spoilers and upwardly deflected flaps.

It is a paramount consideration in the design of any rudder or other control surface that such surface provide the maximum of control effectiveness with the minimum of drag in normal flight, together with freedom from undesirable control reactions. Another factor of particular importance in large and fast aircraft is that the control forces, or hinge moments of the control surface, must be kept sufficiently small to enable the pilot to operate the controls without undue exertion and consequent fatigue.

One of the primary objects of the present invention, therefore, is to provide a novel and improved rudder arrangement for tailless airplanes which is highly effective in its yaw control and which combines the advantageous features of low drag in normal flight, freedom from adverse rolling or pitching moments, and low hinge moments.

Another object of the present invention is to provide yaw control means for a tailless airplane which, in addition, appreciably increases the directional stability of the airplane.

The above objects are achieved in the present invention by providing a plurality of vertically disposed airfoils on the top and bottom surfaces of the wing near the outer ends thereof, the said airfoils being arranged in groups of pairs which are deflected in opposite directions to produce a yawing moment on the airplane. The use of pairs of airfoils which are deflected oppositely has several important advantages over the use of a single airfoil at each wing tip, chief which is the greatly increased effectiveness of the rudders at small angles of deflection. With a single airfoil, the drag is relatively ineffective until the surface has been deflected sufficiently to stall it. Another disadvantage of the single airfoil is that the side forces produced are excessive for the amount of yawing moment. By using pairs of oppositely deflected airfoils, the side thrust of one airfoil is cancelled by the side thrust of the other; hence there is no side force produced on the airplane. At the same time, it has been found that the drag produced by the pairs of airfoils is substantially linear with respect to deflection.

Other objects and advantages of the present invention will become apparent to those skilled in the art after consideration of the following detailed description of the preferred embodiment thereof, reference being had to the drawings, in which:

Fig. 1 is a top plan view of a tailless airplane embodying a rudder arrangement constructed according to the principles of the invention;

Fig. 2 is a slightly enlarged side elevation of the same;

Fig. 3 is an enlarged fragmentary view of the wing tip and rudder arrangement showing the rudder deflected to turn the airplane to the left;

Fig. 4 is an enlarged sectional view taken along the lines 4—4 in Fig. 2;

Fig. 5 is an enlarged sectional view taken along the line 5—5 in Fig. 2;

Fig. 6 is a schematic diagram showing one arrangement of the controls whereby the rudders can be deflected to the configuration illustrated in Fig. 3; and Fig. 7 is a similar diagram, showing an alternative arrangement whereby the rudders can be deflected to another configuration.

In the drawings, the reference numeral 10 designates an airplane having a body 11 and wings 12. Arranged in the trailing edges of the wing 12 and pivotally supported thereon for vertical swinging movement are elevons 13 which are rigged for either simultaneous motion in the same direction for pitch control, or for motion in opposite directions for roll control.

Arranged on the outer tip portion of the wings 12, outboard of the elevons 13, are the rudders, which are designated generally by the reference numeral 14. In the preferred form of my invention illustrated in the drawings, the rudders 14 comprise a plurality of vertically disposed airfoil members 15 arranged in groups of two pairs, designated A and B, on the top and bottom surfaces of the wing. While this arrangement has been found by wind tunnel tests to be the most satisfactory from all practical considerations, it is contemplated that other arrangements and grouping might be used without departing from the scope of the invention as defined by the appended claims. For example, a single pair of airfoil members 15 might be carried on both the top and bottom surfaces of each wing tip, or a single pair might be used on the top surface, with two pairs on the bottom surface.

Each of the members 15 has a symmetrical airfoil section, and is generally rectangular in elevation. As shown in Fig. 4, the outer skin 16 of the member 15 is attached to a spar 17 which is preferably located at approximately 25% of the chord length back from the leading edge, and which is affixed to one end of a vertically disposed torque tube 20. The torque tube 20 may extend through the wing and project from the top and bottom surfaces thereof with rudders 15 fixed to its opposite ends, or alternatively, it may be broken into two length disposed at an angle to one another and connected together inside the wing by universal joints or a flexible connection. In either event, the torque tubes 20 are pivotally mounted in suitable bearings (not shown) in the wing and are operatively connected to the control systems of the airplane so that each pair of rudders on both the top and bottom surfaces of one wing tip is turned in concert to a predetermined angular arrangement. A streamlined fairing 21 enclosing the torque tube 20 is suitably mounted on the wing between the surface of the wing and the adjacent edge of the rudder.

It has been determined experimentally that the best results are obtained by swinging each pair of rudders to a forwardly converging configuration, as illustrated in Fig. 3. Another arrangement, however, might be to swing both rudders of group A in one direction, and both rudders of group B in the other direction, with the corresponding rudders of each group forming a forwardly converging pattern.

Fig. 6 illustrates schematically how the airfoils might be connected to produce the configuration shown in Fig. 3. In this arrangement, oppositely extending arms 22 and 23 are fixed to the torque tubes 20 of each pair of airfoils and are connected together by links 24. The forwardly extending arms 23 are shown as somewhat longer than the rearwardly extending arms 22, and are connected to an operating push rod 25 which extends laterally inwardly to the fuselage 11 where it is suitably connected to one of the rudder pedals (not shown). When the rudder pedal is deflected, the operating rod 25 is pushed outwardly and the interconnected airfoils are swung to the positions shown in Fig. 3.

Fig. 7 illustrates schematically how the airfoils might be connected so that both rudders of group A will be swung in one direction, while both rudders of group B are swung in the opposite direction. In this arrangement, forwardly extending arms 26 are fixed to each of the torque tubes 20, and the arms of the outer pair of torque tubes are connected together by a link 27, while the arms 26 of the inner pair of torque tubes are connected to the operating push rod 25. The inner torque tube of the outer pair has a rearwardly extending arm 28 fixed to it, and this arm is connected by a cross link 29 to the forwardly extending arm 26 of the adjacent torque tube of the inner pair. When the rudder pedal is deflected, the two airfoils of the inner pair are turned in counterclockwise direction, while the two airfoils of the outer pair are turned through the same angle in a clockwise direction by virtue of the cross link connection 29.

One advantage of using groups of two pairs of rudders on the top and bottom surfaces of the wing is that such an arrangement permits use of relatively small rudder members 15. The sum of the hinge moment of a number of small rudders is less than that for a lesser number of correspondingly larger rudders of the same planiform and airfoil section, hence the control forces are less and require less work of the pilot. Another advantage in favor of a larger number of small rudders, particularly on the bottom of the wing, is that better ground clearance is obtained, and danger of damaging the rudders in a bad landing or on extremely rough ground is reduced.

The reason for the employment of groups of rudders on both the top and bottom surface is two-fold: First, to balance pitching moments on the airplane due to the application of drag forces at a vertical distance from the center of gravity, and second, to eliminate torsional stresses in the wing structure. The center of gravity of the airplane is indicated approximately at C and lies in a horizontal plane substantially midway between the centroids of the rudders 15, hence it is seen that the pitching moment of one set of rudders is cancelled by an equal and opposite pitching moment of the other set. Likewise, since both rudders are substantially equidistant from the neutral axis of the wings and on opposite sides thereof, torsional stresses are cancelled.

The directional stability of the airplane is appreciably increased by virtue of the side fin area presented by the rudders aft of the center of gravity of the airplane when the rudders are in neutral position.

While I have shown and described a preferred and specific form of my invention with some degree of particularity, it will be understood that the drawings and description are to be considered merely as illustrative of, and not restricted on the broader claims appended hereto, for various changes in design, structure and arrangement may be made without departing from the spirit and scope of said claims.

I claim:

1. In a tailless airplane, the combination of a wing, a pair of substantially identical laterally spaced airfoil members arranged entirely side by side at the tip end of said wing adjacent the trailing edge thereof, said members being disposed perpendicular to the surface of said wing and normally substantially parallel to the line of flight whereby they contribute an appreciable amount of directional stability to the airplane, each of said members being pivotally supported for swinging movement about a vertical axis ahead of and in close proximity to center of pressure of said member, and control means for simultaneously rotating both members of said pair in opposite directions and through equal angular distances to a forwardly converging relationship for producing a yawing moment on the airplane.

2. In a tailless airplane, the combination of a wing, a plurality of pairs of substantially identical laterally spaced members of symmetrical airfoil section arranged entirely side by side at the tip end of said wing adjacent the trailing edge thereof, at least one of said pairs of members being disposed on the top surface of said wing, and at least one pair of members being disposed on the bottom surface of the wing, said members being disposed vertically and normally substantially parallel to the line of flight whereby they contribute an appreciable amount of directional stability to the airplane, each of said members being pivotally supported for swinging movement about a vertical axis ahead of and in close proximity to center of pressure of said member, and with each of said members on the top surface of the wing each being connected with its corresponding member on the bottom surface of the wing to rotate therewith, and control means for turning both the top and bottom pairs of members at one wing tip to converge forwardly for producing a yawing moment on the airplane.

ALFRED J. KLOSE.

REFERENCES CITED

The following references are of record in the file of this patent:

UNITED STATES PATENTS

| Number | Name | Date |
|---|---|---|
| 1,718,707 | Salisbury et al. | June 25, 1929 |
| 1,771,053 | Martin | July 22, 1930 |
| 1,974,407 | Barnhart | Sept. 25, 1934 |
| 2,173,538 | McKellar | Sept. 19, 1939 |
| 2,326,819 | Berlin | Aug. 17, 1943 |
| 2,390,939 | Huff | Dec. 11, 1945 |

FOREIGN PATENTS

| Number | Country | Date |
|---|---|---|
| 408,550 | France | Mar. 29, 1910 |
| 112,775 | Great Britain | Jan. 2, 1919 |